May 9, 1967 L. HIDEG 3,318,292
INTERNAL COMBUSTION ENGINE
Filed Dec. 10, 1964 5 Sheets-Sheet 1

LASZLO HIDEG
*INVENTOR*

BY John R. Faulkner
Robert E. McCollum
*ATTORNEYS*

LASZLO HIDEG
INVENTOR

BY John R. Faulkner
Robert S. McCollum

ATTORNEYS

United States Patent Office 3,318,292
Patented May 9, 1967

3,318,292
INTERNAL COMBUSTION ENGINE
Laszlo Hideg, Dearborn Heights, Mich., assignor to Ford Motor Company, Dearborn, Mich., a corporation of Delaware
Filed Dec. 10, 1964, Ser. No. 417,328
7 Claims. (Cl. 123—32)

This invention relates to an internal combustion engine of the spark ignition type. More particularly, it relates to a stratified charge combustion process for use in such an engine in which fuel is burned in an excess of air, and stratification exists at all load and speed levels prior to ignition.

A conventional internal combustion engine burns a homogeneous mixture of air and fuel that is supplied to it from outside the engine by a carburetor or other suitable mixture means. The engine is not designed to operate with perfect combustion at all times for several reasons. One is that an excess of air is needed at part loads not only to internally cool the combustion gases to reduce the heat energy losses to the coolant and improve the expansion efficiency, but also to reduce the increased suction effect caused by throttling to reduce the pumping losses. Under these conditions, therefore, the homogeneous mixture should be lean.

On the other hand, for maximum power, additional fuel is needed to insure that all of the oxygen in the air will be burned, since the maximum power producing ability of the engine is limited by the amount of air it can take in. For this condition, the mixture should be richer than that for perfect combustion.

The conventional engine, therefore, needs an excess of air or fuel at times depending on the particular operating conditions. However, the fuel-air ratio for a conventional engine is usually maintained only within a narrow range, primarily because homogeneous mixtures containing an excess of air cannot be ignited, and an excess of fuel is not economical. Because of this narrow range, therefore, the additional air that is needed during operation at part loads, for example, is usually not provided, and the engine, therefore, tends to operate at these times with reduced efficiency.

The use of a homogeneous charge also results in a disadvantage. At ignition, with a center spark plug, for example, in the conventional engine, the progressive expansion of the combustion products against the contiguous unburned air-fuel mixture molecules causes a rapid increase in pressure spreading outwardly towards the periphery of the chamber. With a high compression ratio engine, this results in a raising of the temperature of the unburned particles to such a point that they ignite before the flame has had time to reach the mixture. This pre-ignition or detonation effect not only causes noise and results in a reduction in power, but can damage the walls of the combustion chamber due to the high velocities at the points of self-ignition tearing away the protective boundary layer of air at the cylinder walls. This usually forces the design of a lower compression ratio engine.

A further disadvantage of the conventional internal combustion engine is that the forced use of relatively rich mixtures results in higher gas temperatures, which generally results in the presence of undesirable elements in the exhaust gas stream at the end of combustion, and insufficient oxygen to reduce the unburned fuel particles to less harmful forms.

The invention eliminates the above disadvantages by providing an internal combustion engine that operates with efficient combustion at all times. The engine utilizes a stratified charge combustion process. That is, a charge of fresh air or a very lean air-fuel mixture is taken into the cylinder bore with a predetermined motion and then is guided by the shape of the head and piston surfaces and bore walls into a swirl motion about a predetermined axis; and the fuel is introduced in such a manner that it does not significantly disturb the swirl air motion or cause extra mixing between the fuel impregnated and residual fresh air portions.

In general, in one embodiment, the combustion process of the invention is as follows. The air inlet passage and port are so constructed and arranged that a charge of air is introduced substantially tangential to the cylinder head and proceeds from one side of the chamber to the other, where it is then turned by the shape of the chamber walls to swirl essentially about a horizontal axis. The fuel is introduced either directly into a portion of the incoming air, or splashed against a surface past which the fresh air flows so as to impregnate the edge mass of air and be carried around the cylinder bore with a swirling motion. Some of the heavier fuel particles are deposited on a combustion chamber wall and subsequently evaporated from it to mix with the fuel impregnated air portion by reason of its swirling motion.

The portions of air that carry the fuel into the cylinder are, therefore, initially overrich. The swirling motion of the air immediately causes a slow natural diffusion of this fuel into the adjacent essentially fresh air portion. The magnitude of the fuel impregnated portion, therefore, increases. A further slight diffusion or leaning of the mixture occurs during the compression stroke before the top dead center position of the piston. However, this mixing is not rapid enough to significantly disturb the swirling air motion. An additional rapid mixing that does begin to disturb the swirl occurs when the squish action becomes effective. However, in no case is the squish action permitted to be strong enough to provide a complete mixing between all the portions prior to ignition. Therefore, there is always a portion of fresh air available at ignition for cooling and other purposes described previously.

Stated in another way, the ignition timing is such that it permits just enough leaning of the initially rich mixture by diffusion and squish action, depending upon the load, to provide the correct strength to the mixture at the spark plug at ignition. At light loads, for example, the fuel impregnated portion is ignited before the squish action of the piston becomes strong enough to disturb the swirl motion and cause additional mixing between the fresh air and fuel impregnated portions. For elevated loads, the fuel impregnated portion is initially richer, and ignition is, therefore, delayed to permit some squish action to disturb the swirl motion and promote rapid mixing of the fuel impregnated portion with the adjacent fresh air portion before ignition. That is, the delay in ignition permits enough squish action to lean the mixture to the right strength at time of ignition. The ignition timing, however, is controlled so that even at full loads, the squish action strength is not enough to provide complete mixing between all the portions.

At ignition, therefore, the fuel impregnated portion will have a rich portion and a lean part. The spark plug generally is oriented and located contiguous to the richer part of the fuel impregnated portion for easier ignition.

The end result of stratifying by the process of the invention is that at ignition the cylinder contains a fuel impregnated portion and a fresh air or very lean (more than 40–1) mixture portion. The fuel impregnated layer has a rich part and a lean portion. The fuel in the lean part is cooled by the excess air surrounding it and, therefore, requires a temperature to ignite it that is higher than that needed to ignite the fuel in the rich part. This substantially reduces the possibility of detonation or pre-ignition. The fresh air portion that is present at all times at ignition allows expansion of the combustion gases and the unburned fuel particles after ignition without detonation, and also provides air for after-mixing and burning during the reverse squish action of the piston. That is, at ignition, all the fuel in the rich part generally does not ignite. This fuel then mixes with the fresh air still available in the cylinder after ignition to be ignited by the flame and burned.

The stratified charge combustion process of the invention is carried out by a number of illustrated constructions. In some embodiments, the air enters one side of the combustion chamber essentially symmetrically of a chamber centerline and is guided by the chamber surfaces into a swirl pattern. In one embodiment, the air swirls about an axis that is substantially perpendicular to the centerline of the cylinder bore. The fuel is introduced by depositing it on one wall of the intake valve port so that it is carried into the combustion chamber by an edge portion of the incoming air charge. Some of the fuel wets the cylinder head face as it passes by it, while the rest of the fuel mixes with the air in the edge portion due to the swirling motion of the air. The fuel on the wetted surface is quickly evaporated as the swirling air flows past it and diffuses into the fuel impregnated air portion. The swirling motion of the air portions causes a slow natural leaning of the mixture into the adjacent fresh air portion. The initial part of the compression stroke also causes a slight mixing between these portions. Additional rapid mixing with the fresh air layers due to the squish action will occur or not as a function of the load; however, even at full loads, the ignition is timed to occur before the squish action is strong enough to completely disturb the entire swirl motion and provide complete mixing between all portions. At ignition, therefore, there exists a fuel impregnated end layer and a residual fresh air portion.

In another embodiment, the fuel is introduced at a low particle velocity by directing it against one edge of the intake valve so that it is deflected into an end or edge portion of the fresh air charge and moved toward the spark plug.

Another embodiment provides a rib or partition in the intake valve port to divide the incoming air charge into large and small volume portions. The fuel is injected at a low particle velocity into the smaller volume air charge and carried into the combustion chamber in the fresh air end portion of the total charge. This embodiment also provides a swirling motion to the air charge about the longitudinal axis or centerline of the cylinder bore.

A further embodiment provides primary and secondary air intake valves operating in parallel; the larger portion of the fresh air being taken in through the primary intake valve, while fuel is mixed with the remaining air in the secondary intake port and introduced into the cylinder as the end or edge portions.

Another embodiment utilizes primary and secondary intake valves operating in series so that approximately three-quarters of the fresh air charge is taken in through the primary intake valve before it closes, with the remaining quarter being mixed with fuel in the secondary intake port and then introduced into the combustion chamber as a top portion of the air charge.

Further embodiments illustrate constructions wherein the air portion swirls in a horizontal plane, and all the fuel is injected either directly into a top air portion or against either the cylinder head face or the top of the piston. The same process of operation, however, exists as in the previously described embodiments in that the top or bottom swirling portion, as the case may be, becomes impregnated with fuel, the slight natural diffusion and more rapid squish action promoting mixing with the adjacent residual fresh air portions in proportion to the load, but never enough to provide complete mixing between all the layers prior to ignition.

One of the objects of the invention, therefore, is to provide an internal combustion engine construction using a combustion process that burns fuel in an excess of air in a manner to provide efficient combustion at all times by providing partial stratification at all times.

A further object of the invention is to provide an internal combustion engine that substantially reduces the presence of undesirable elements in the exhaust gas stream.

A still further object of the invention is to provide an internal combustion engine construction wherein the fuel is introduced into the combustion chamber in a manner not to cause a significant disturbance to the air motion or extra mixing between the fuel impregnated portions and the fresh portions.

It is a still further object of the invention to provide an engine construction utilizing the process described whereby a change in power can be accomplished not only by controlling the fuel introduction beginning and ending, but also by controlling the time of ignition as a function of the rise in squish action strength so that the degree of mixing between the fuel impregnated portions and adjacent residual fresh air portions is controlled as a function of the load.

Another object of the invention is to provide an internal combustion engine that is simple in construction, efficient in operation, and economical to manufacture.

Other objects, features and advantages will become apparent upon reference to the succeeding, detailed description of the invention, and to the drawings illustrating the preferred embodiments thereof; wherein.

Figure 1:
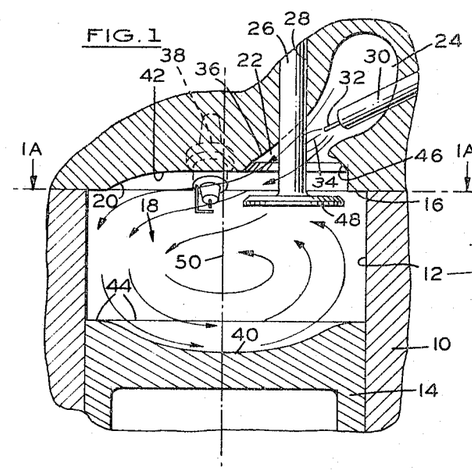
FIGURE 1 illustrates a cross-sectional view of one cylinder of an engine utilizing the stratified combustion process of the invention.

For clarity, FIGURE 1 shows only one cylinder of an internal combustion engine embodying the stratified charge combustion process of the invention. It will be clear, however, that as many identical cylinders could be provided as needed so long as each of the cylinders is constructed to provide the same operation to be described. In each of the embodiments to be described, identical parts are given the same reference numerals.

The engine in FIGURE 1 includes a block 10 that has a substantially cylindrical bore 12. The bore slidably receives a reciprocating piston 14 that sealingly closes one end of the bore. The opposite bore end is covered by a cylinder head 16, which together with the walls of the cylinder and the top of the piston defines a variable volume combustion chamber 18. Piston 14 is connected in the usual manner to the crankshaft of the engine (not shown) to be reciprocated from the position shown to a top dead center position closely adjacent the face 20 of cylinder head 16.

The cylinder head is provided with an air intake port 22 connected to an intake manifold 24. The port is opened or closed by the movement of a valve 26 that is slidable in a bore 28 in the head. A fuel injector 30 projects into manifold 24, and is provided with a nozzle 32 that ejects a narrow angle, low particle velocity spray of fuel 34 against a wall 36 of intake port 22. A conventional spark plug 38 projects into combustion chamber 18 below the face 20 of the cylinder head, as shown.

Both the top of piston 14 and the facing portion of cylinder head 16 are provided with suitably faired cavities 40 and 42 providing a squish area 44 between the flat face portions of the top of the piston and the oppositely facing portions of cylinder head face 20. The cylinder head is also provided with a seat 46 for the intake valve head 48.

As best seen in FIGURE 1, the air intake manifold 24 and port 22 are formed to accelerate the mass of air into the combustion chamber. They also, together with the curved shapes of the piston top and cylinder head face, induce flow of the air into the combustion chamber so that it flows essentially as a mass horizontally from one side of the chamber to the other (FIGURE 1A) following the cylinder head surface. It is then turned by the cylinder head surface to vertically follow the bore walls and be turned again by the dish shaped piston surface, and the opposite bore wall. Thus, a swirl motion is imparted to the mass of air, the motion being about an axis substantially perpendicular to the centerline 50 of cylinder bore 12. This swirling air motion is maintained during the intake stroke and part of the compression stroke. By suitably controlling the intake air jet velocity and turbulence level, only a relatively slow mixing or diffusion occurs between portions. The fresh air is thus, for all intents and purposes, maintained stratified into portions.

At the time of induction of the air charge into combustion chamber 18, fuel is injected from nozzle 32, either by continuous or interrupted injection, against wall 36 of the intake port to wet this surface and impregnate a portion 52 (FIGURE 1A) of fresh air in contact with it. This fuel, as well as the already evaporated fuel, is then carried into the combustion chamber as an end portion, and some of the larger liquid particles will be deposited on a portion of the cylinder head face 20. The swirling motion of the fuel impregnated portion rapidly evaporates the fuel from the wetted surface and the slow natural mixing between charge portions causes some of the fuel to diffuse into the air in the adjacent portion. That is, the fuel initially impregnates an end portion, which slowly grows by the leaning of the mixture into the adjacent fresh air portion due to the slight natural mixing between portions caused by molecular motion. No significant mixing occurs, however, between this end portion and the residual fresh air portions until the squish action becomes strong enough to promote this mixing.

Figure 1A:
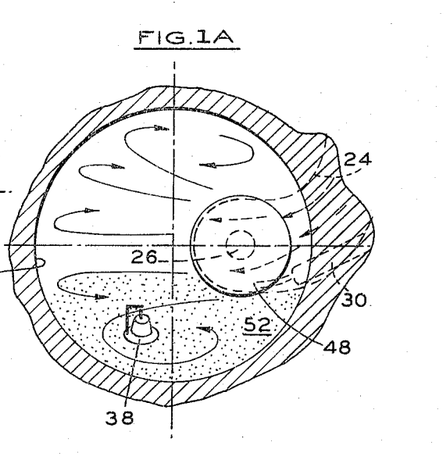
FIGURE 1A is a cross-sectional view taken on a plane indicated by and viewed in the direction of the arrows 1A—1A of FIGURE 1.

When piston 14 begins its compression stroke, the stratified charge portions become slightly compressed, which induces a further slight mixing of the fuel with the air in the adjacent portion. FIGURES 1 and 1A show the fuel impregnated portion confined to an end portion of the cylinder and constituting essentially one-third of the total air charge at approximately 35° before top dead center position of the piston. At this time the squish action has not become strong enough to disturb the swirl motion. For light loads, therefore, the mixture is ignited at this time.

Spark plug 38, in this case, is positioned at the side of the cylinder bore where the fuel impregnated air portion is located. The plug can protrude below the cylinder head face or be recessed into a pocket located in the path of the impregnated intake air jet portion. This recessed arrangement results in the collection of liquid fuel particles in the pocket which later evaporate and form a rich region immediately around the spark gap for sure and high energy ignition of the charge.

At elevated loads, the fuel impregnated portion is initially richer. Ignition is, therefore, now delayed until the squish action can provide just enough disturbance to the swirl motion to cause sufficient mixing of the fuel with the adjacent residual fresh air portions to establish the correct mixture strength at the spark plug at the time of ignition. The magnitude or thickness of the fuel impregnated portion, therefore, increases in proportion to the load. At elevated loads, the mixture will occupy, say, one-half of the volume of the combustion chamber, for example.

At full loads, the further increase in initial richness and necessary longer delay in ignition decreases even more the magnitude of the residual fresh air portions remaining in the cylinder bore. At this time, the squish action becomes quite strong and, therefore, causes rapid leaning of the air-fuel mixture into the adjacent fresh air portions. The ignition timing, however, is controlled so that before the squish action can cause complete dilution of the fuel into all of the residual fresh air, the mixture is ignited, thus maintaining a stratified substantially fresh air end portion in that part of the chamber that is farthest from the spark plug. This reduces the possibility of detonation, and permits the application of elevated compression ratios.

At very light loads, or less than the one-third load condition described, ignition occurs at about 35° before top dead center, and the charge of air taken in through port 22 would be slightly throttled, by means not shown, so that the correct light mixture strength is obtained at ignition.

Figure 2:
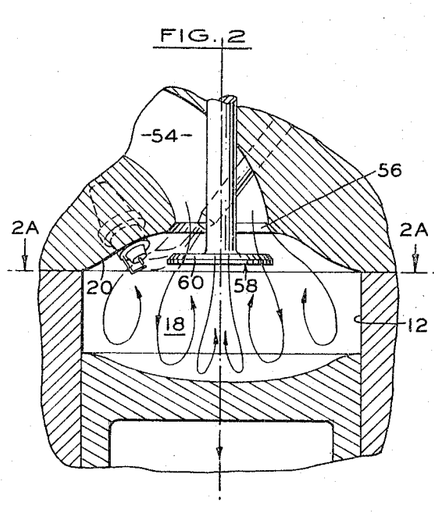
FIGURE 2 is a cross-sectional view similar to FIGURE 1 illustrating a modification.
Figure 2A:
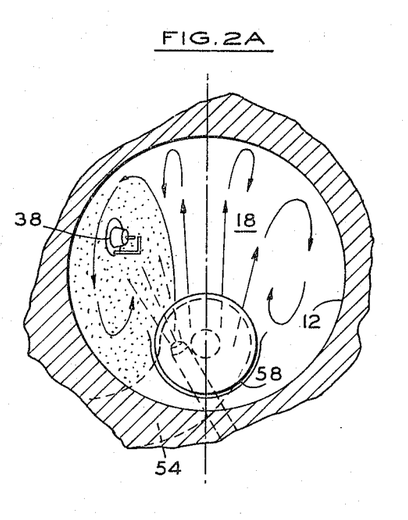
FIGURE 2A is a cross-sectional view taken on a plane indicated by and viewed in the direction of arrows 2A—2A of FIGURE 2.

FIGURE 2 illustrates a construction whereby fuel is introduced into the combustion chamber in a slightly different manner. The over-all combustion process, however, remains the same. FIGURE 2 shows an engine having an air intake manifold 54, intake port 56, and intake valve 58. The intake valve is symmetrically arranged with respect to one centerline of the cylinder bore and offset with respect to the other. The cylinder head face 20 in this instance, as in FIGURE 1, is formed to cooperate with the shape of the piston top to promote a flow of air across the combustion chamber from one side to the other and with a swirling motion about an axis substantially perpendicular to the bore centerline.

The fuel is injected during the intake stroke directly against an edge 60 of intake valve 58. The direction of the spray is selected so that after being deflected by the valve surface, the fuel particles move toward spark plug 38. Part of the fuel is deposited on the cylinder head face 20, with the remaining portion being carried away by the edge portion of the mass of air. The end air layer thus picks up the fuel and mixes it with the air, the swirling motion of the air rapidly evaporating the fuel from the surface and causing a slight mixing of it with the adjacent residual fresh air portion. Spark plug 38 is advantageously located in a position to project into the fuel impregnated portion.

The remaining portion of the operation is essentially the same as already described in connection with the FIGURE 1 embodiment; that is, the amount of squish action needed to lean the mixture before ignition being regulated as a function of the load, but never enough to cause complete mixing.

Figure 3:
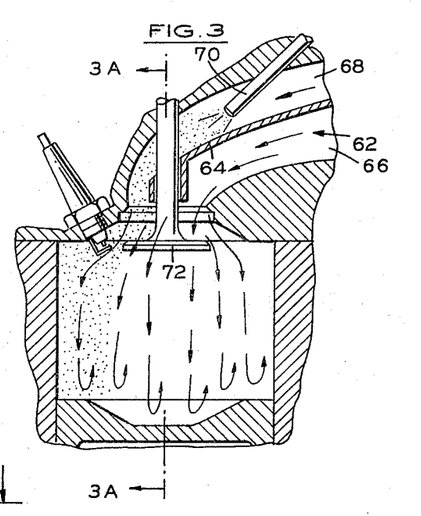
FIGURE 3 is a cross-sectional view similar to FIGURE 1 illustrating another embodiment of the invention.
Figure 3A:
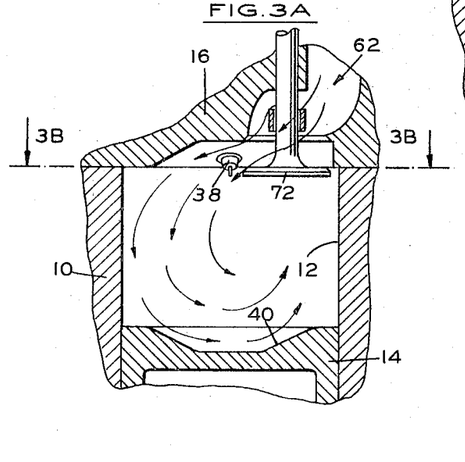
FIGURES 3A and 3B are cross-sectional views taken on planes indicated by and viewed in the direction of the arrows 3A—3A, 3B—3B, respectively, of FIGURES 3 and 3A.
Figure 3B:
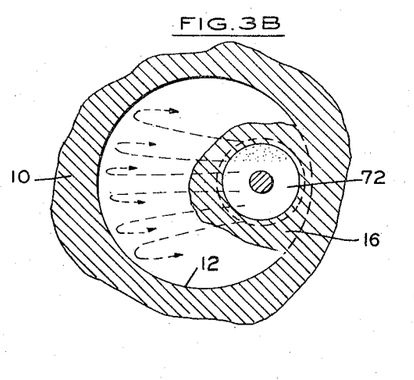

FIGURE 3 illustrates a divided intake port construction for obtaining the stratified charge combustion process described in connection with the FIGURES 1 and 2 embodiments. In FIGURE 3, the air intake passage 62 is provided with a rib or partition 64 that projects down to the valve head and divides the passage into large and smaller volume passages 66 and 68. In this instance, the main charge of fresh air is taken in through the larger volume passage 66, while the fuel is sprayed from an injector 70 into the air in the smaller passage 68. The fuel is, therefore, carried past intake valve 72 into the cylinder volume in the end portion of the air, and carried around with the swirling end portion. The same means of valve circumference shading and intake port shaping as was used in the previous constructions is used to impart a swirling motion to the air flowing in a closed path essentially in a vertical plane.

The larger particles of fuel are deposited on a portion of the cylinder head face and rapidly evaporated from it by the swirling motion of the end portion of the air charge. The spark plug 38 again is located to project into the fuel impregnated air portion. Although the fuel is shown as being introduced into passage 68 by an injector 70, it is also within the scope of the invention to mix the fuel with the air of the small division 68 by means of a rich mixture carburetor.

Figures 4, 4A, 4B:
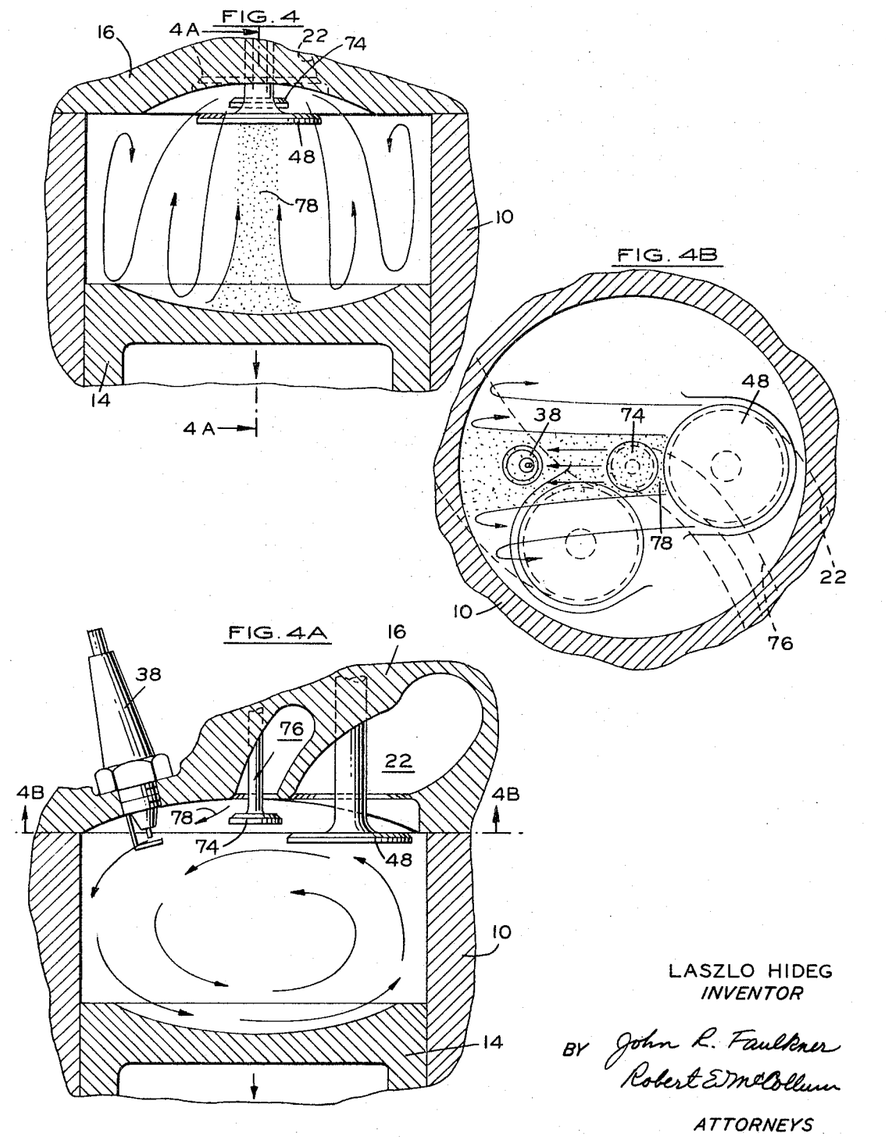
FIGURE 4 is a cross-sectional view similar to FIGURE 1 illustrating a further embodiment of the invention.
FIGURES 4A and 4B are cross-sectional views taken on planes indicated by and viewed in the direction of the arrows 4A—4A and 4B—4B, respectively, of FIGURES 4 and 4A.

FIGURES 4, 4A and 4B illustrate a construction in which a secondary intake valve 74 is used, the two intake valves being operated in parallel. Both of the intake ports 76 and 22 and valves 74 and 48, in cooperation with the concave shape of the piston top and cylinder head face, are again designed to organize and direct the intake air into the cylinder volume in the same general direction across and around the chamber with a swirling motion about an axis substantially perpendicular to the centerline of the cylinder bore.

The secondary intake valve 74 is located substantially in the center of the cylinder bore, as shown. The two valves move in parallel and can be operated by the same rocker arm, not shown. The main volume of fresh air is inducted through primary intake valve 48 simultaneous with the introduction of an air-fuel mixture 78 past secondary intake valve 74. The fuel can be mixed with the secondary intake air either by a rich mixture carburetor or by intake manifold injection. The secondary intake port would be slightly throttled to assure a smooth blending of the rich mixture with the primary air jet.

This fuel introduction method results in the impregnation of a central or intermediate portion of the total air charge, leaving two residual fresh air end portions, as best seen in FIGURES 4 and 4B. While the secondary valve is shown in a central location, it could be located at the side of the cylinder bore, if desired, to impregnate an end portion of the swirling air.

The further operation remains essentially the same as previously described; that is, the incoming fuel particles wet a portion of the cylinder head face 20 adjacent the intermediate or central portions of air, and are subsequently evaporated by the swirling motion of the air. The slow diffusion between air portions causes the mixture to lean outwardly from the center, the initial compression by the piston effecting a further slight mixing of the fuel in the central air portion with the adjacent residual air. Depending upon the load, additional rapid mixing with the residual fresh air portions is obtained by permitting squish action to affect the swirl motion.

In the FIGURES 1-4 embodiments, the intake ports and valves were designed to generate a swirling motion to the intake air about an axis substantially perpendicular to the centerline of the cylinder bore. In the FIGURES 5-9 constructions, the intake ports and valves are formed to generate a swirling motion about the axis of the cylinder bore so that the residual air and fuel impregnated portions will be horizontally disposed and radially stratified.

Figure 5:
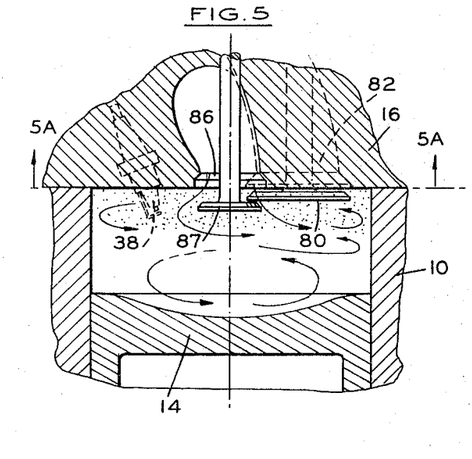
FIGURES 5 and 6 are cross-sectional views similar to FIGURE 1 illustrating further embodiments of the invention.

FIGURE 5 shows a construction in which two intake valves operated in series are used to obtain the stratified charge combustion process of the invention. The cylinder head face is flat, and the primary intake valve 80 and port 82 are designed to generate a swirling motion to the incoming air about the cylinder bore longitudinal axis. Also, the valve and port handle only fresh air, and are made of a size to pass approximately three-quarters of the total fresh air charge into the cylinder bore before the valve 80 closes and a secondary intake valve 84 opens.

The fuel is mixed with the air in the secondary intake port 86 by means of either a rich mixture carburetor or an intake manifold injector, not shown. The fuel is then inducted along with the remaining approximately one-quarter volume of the air flow into the cylinder volume so that the fuel impregnated air portion lies on top of the residual fresh air portions.

Figure 5A:
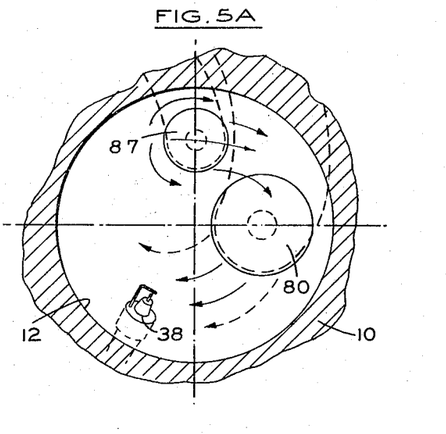
FIGURES 5A, 6A and 6B are cross-sectional views taken on planes indicated by and viewed in the direction of the arrows 5A—5A, 6A—6A and 6B—6B of FIGURES 5, 6 and 6A, respectively.

The secondary intake port 86 can be formed to impart swirl to the fuel impregnated top air portion, or the top portion can assume the swirling motion through friction with the revolving lower fresh air portions. The secondary intake valve 84 is shown in FIGURE 5A as located to the side of the cylinder bore, but could be located centrally as shown in FIGURE 4B, if desired.

Secondary valve 84 is designed with a shuttle valve action. The valve seat is sunk into the cylinder head face at the bottom of a cylindrical hole. The hole is made with small clearance to the valve head outside diameter. With this design, the secondary valve can begin to move before the port opening is scheduled, thus permitting faster overchange between the two valves and better loading conditions of the secondary valve gear.

In operation, the opening and closing movements of the two intake valves 80 and 84 are scheduled so that, initially, during the first part of the intake stroke, approximately three-quarters of the total air charge enters through the primary valve with an axial swirling motion. From this time or until the end of the intake stroke, a rich mixture, representing approximately a quarter of the total charge, is introduced to the top of the air swirl through the secondary valve. During the piston compression stroke, the rich top mixture slowly mixes with the adjacent lower fresh air, resulting in the impregnation of about one-third of the total air at say 35° before top dead center position of the piston, for example, before the squish action begins to cause any additional mixing. The remaining leaning operation of the mixture is similar to that previously described. Spark plug 38 again is located in a position closely adjacent the center of the fuel impregnated top air portion.

In the FIGURES 1-4 constructions, the fuel was not introduced directly against the cylinder head face or piston top surface, but was either mixed with the air in the primary or secondary intake valve ports, or splashed against the intake port wall, or deflected off the edge of the intake valve head. That is, only a smattering of fuel particles wet the cylinder head face or combustion chamber walls. Also, the air swirl was not as smoothly organized because the swirl about an axis substantially perpendicular to the centerline of the bore causes the air to travel in a path that is not perfectly cylindrical. Also, the characteristics of the fuel injectors were closely controlled, and the fuel in general was injected early during the intake stroke. Any secondary air motion that resulted was, therefore, negligible.

Figure 6:
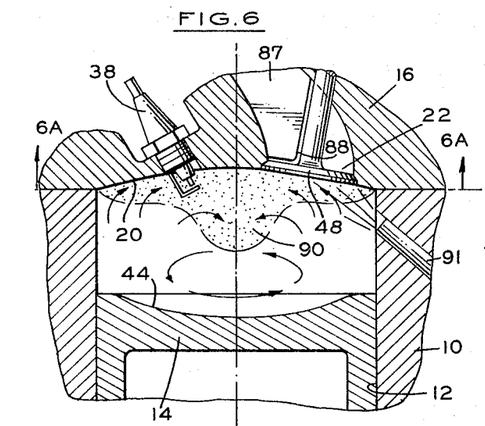
Figure 6A:
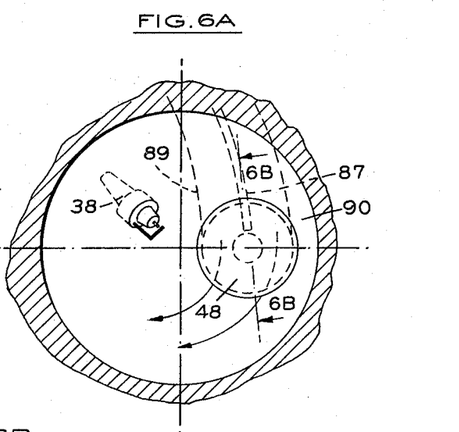
Figure 6B:
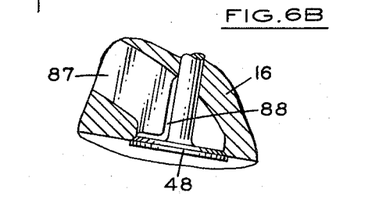

FIGURE 6 shows a construction where the fuel injection is late, and all of the fuel is introduced to the top portion of the air charge by a so-called semi-direct injection method that injects fuel directly against the cylinder head face 20 adjacent intake valve 48. A dome-like combustion chamber is used, along with a piston that has a faired cavity 44 in its top face. The air intake port 22 is designed to impart an axial swirling motion to the fresh air charge about the longitudinal axis of the bore, with the shape of the combustion chamber promoting this motion.

The air intake port is divided by a rib 87 that is parallel to the stem of valve 22 and extends along the valve outline with a small gap 88 between. The divided port makes possible a variation of the air charge swirl rate. Partial throttling of the inside division 89 causes an elevated air velocity in the outside division 90, thus an elevated rate of air swirl in the cylinder. Complete closing of inside division 89 results in the highest swirl rate.

A fuel injector 91 is located in the side wall of cylinder bore 12, and sprays fuel against the cylinder head face 20 near intake valve 22. The injector 91 in this case is a simplified one since substantially all that is required is that the fuel be sprayed late against the cylinder head face. Therefore, although injector nozzles are used to inject the fuel directly into the engine cylinder, and, therefore, a good injector sealing is needed, a number of control characteristics of the conventional fuel injection system can be omitted. For example, uniform atomization of the fuel is not required. Therefore, the use of fixed orifice injectors with low injection pressures is feasible. The maintenance of the spray cone angle is not critical, nor are the characteristics of the beginning and ending of injection and the uniformity of injection rate. Also, the duration of injection can be selected to suit inexpensive injection pump design. The injection in this case occurs during the compression stroke soon after bottom dead center position is reached, when the cylinder pressure is low. Therefore, injection against high cylinder pressure is not required, and the use of inexpensive injection nozzles and unit injector designs is possible.

When the fuel is injected directly against the cylinder head face, and the air layers swirl in a smooth substantially circular path about the bore axis, a secondary air motion becomes noticeable. One of the reasons for this is that, as previously mentioned, when the air swirls around the combustion chamber about an axis substantially perpendicular to the bore axis, the swirl path is not as uniform as when the air is swirling about the bore axis and following the smooth side walls of the bore. As a result, the secondary air motion to be described is negligible in the vertical swirl cases in comparison to the over-all air motion. Also, the introduction of the fuel into the air charge instead of onto a combustion chamber wall tended also to make this secondary air motion less noticeable.

In FIGURE 6, the fuel injector 91 is installed in the cylinder wall so that a low velocity fuel spray hits the cylinder head face depositing all the fuel on it. The injection takes place during the compression stroke when the cylinder pressure is still low. During the compression stroke, the fuel evaporates and mixes with the air in the boundary layer of the swirling air. In the boundary layer at the cylinder head face, the tangential air velocity is lower than in the main air body; therefore, the centrifugal force acting on the swirling air molecules is not adequate to equalize the suction effect of the swirl core. This unbalance sets up a secondary inward flow in the boundary layer; that is, the air particles close to the cylinder head surface move inward and try to fill up the core. The replacement of these air particles comes from the main air body. The fuel vapor and particles that are deposited on the cylinder head face adjacent this boundary layer are, therefore, carried into the core of the swirl, allowing access of new fresh air particles to the still wet cylinder head surface. This mixing process results in the impregnation of the top portion of the air swirl with fuel, and the portion having a slight inward bulge at the center.

The secondary mixing action, therefore, results in the impregnation of the top portion of the swirling air charge with fuel, the remaining lower residual fresh air being maintained stratified therefrom and having a swirling motion about the longitudinal axis of the cylinder bore.

With low swirl rate, the slow mixing or diffusion of the fuel in the impregnated air portion into the adjacent fresh air portions causes the mixture to be confined to approximately one-quater of the air charge at, say, 35° before top dead center position, for example, before the squish action strength becomes strong enough to cause additional rapid mixing or leaning of the mixture farther into the adjacent fresh air. This is similar in action to the previously described constructions. At quarter load, therefore, ignition would take place at this time. The spark plug 38 is installed as shown in a position that permits a spark gap location close to the center of the bore.

At elevated loads, higher swirl rates and delayed ignition are used. The higher swirl rate can be obtained by suitably blocking the intake port as described. This results in faster evaporation of the fuel particles from the wetted surface, and a thicker fuel impregnated top air charge portion. The later ignition permits some squish action to cause the fuel impregnated portion to grow into the adjacent fresh air portion to obtain sufficient leaning of the mixture until it is at the correct mixture strength at the time of ignition.

As in the previous embodiments, light load operation, or operation at less than one-quarter load, for example, is achieved by partially throttling the air intake.

Very light load operation can also be achieved without throttling if variable injection timing is used. That is, late injection of small amounts of fuel would result in less fuel dispersion, and thus an ignitible top mixture charge portion of small magnitude.

Figures 7, 8, 9:
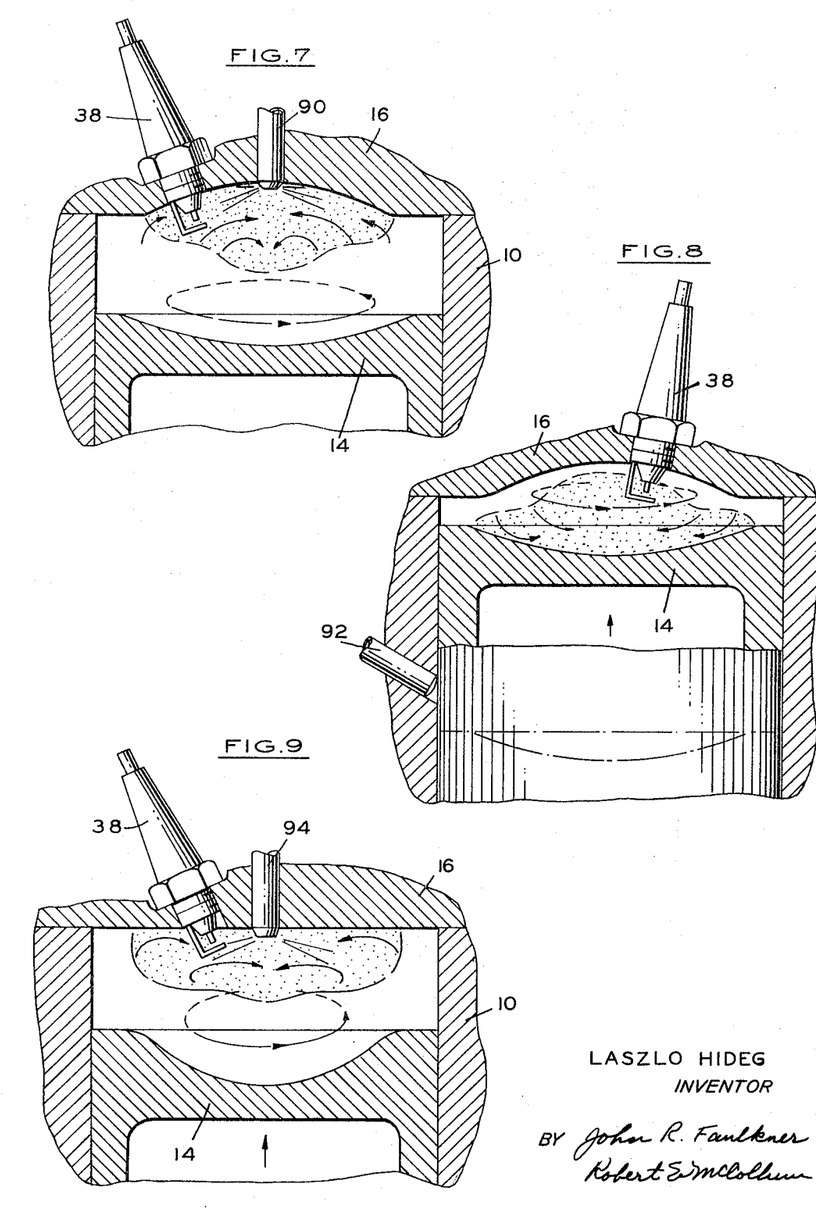
FIGURES 7, 8 and 9 are cross-sectional views similar to FIGURE 6 illustrating modifications thereof.

FIGURE 7 illustrates a variation of the construction of FIGURE 6 in which the fuel injector 90 is located substantially in the center of the cylinder head, and is provided with a wide cone angle nozzle that injects fuel onto opposite sides of the cylinder head face. This type of installation would be favorable for constructions using unit injectors.

FIGURE 8 shows a further modification of FIGURE 6 in which the fuel injector 92 is installed in the cylinder wall close to the bottom dead center position of the piston. The fuel is deposited on the piston top surface. As an alternative, the piston again has a cavity 44 that could be offset to one side, if desired, to achieve more favorable conditions for depositing the fuel.

FIGURE 9 shows still a further modification of the FIGURE 6 construction wherein the top swirling portion of the air is impregnated with fuel by direct injection. The cylinder head face 20 in this case is flat, while the cavity 44 in the piston is deeper. These shapes, in addition to a suitably formed intake valve port (not shown), generate a high rate of swirl to the incoming air. The spark plug 38 is installed to locate the spark gap close to the center of the bore.

The fuel injector 94 is installed in the cylinder head and along the cylinder axis. If desired, it could be slightly tilted or installed slightly offset from the center and tilted. The fuel is injected during the compression stroke in approximately a 90° to 180° wide cone angle fuel spray. The atomization of the fuel is fine and uniform, and the particle size can be as much as 6 to 10 times larger than is suitable for use in diesel sprays, for example. The initial velocities of the fuel particles are low. Velocities, induced by a 150 to 800 p.s.i. pressure drop, for example, are satisfactory.

The ending of injection is constant from zero to half load, and timed to occur at approximately 90° to 30° before top dead center. Above half load, the injection ending would be advanced to permit sufficient time for leaning of the rich mixture. The beginning of injection would be a function of the load if constant injection rate is applied.

At light load, when the injection is short, the low velocity fuel particles penetrate only a short distance into the top portion of the swirling air before the drag forces cause the fuel to move with the air. In the meantime, the fuel droplets evaporate and mix with the surrounding air molecules to impregnate the top portion of the swirling air, which, due to the secondary air motion, has a bulge at the middle of the swirl. The rate of injection is selected so that at, say, 20°–60°, for example, after injection ending, when ignition takes place, the impregnated air portion is at the right mixture strength for the lightest load.

At elevated loads, the injection duration is longer. Therefore, the fuel spray now penetrates deeper. That is, the earlier injection beginning means that the earlier injected particles are injected into lower density air, thus traveling farther. This results in more dispersion of greater fuel amounts, thus the impregnation of a larger magnitude top air portion to the right mixture strength. The ignition at elevated loads is later, thus enabling the squish action to cause additional mixing. At full loads, the charge is still slightly stratified at ignition, thus decreasing the danger of detonation.

From the foregoing, it will be seen that the invention utilizes a stratified charge combustion process that induces air flow across the combustion chamber essentially in one general direction and by the shape of the chamber than with a swirling motion about a common axis; that the fuel is introduced into the air charge in such a manner that it causes no significant disturbance of the air motion or substantial mixing between the impregnated and residual fresh air portions; and that rapid mixing between the impregnated and fresh air portions by squish action is controlled in accordance to the load, and in any event, never provides complete mixing between all the portions.

While the invention has been illustrated in its preferred embodiments in the figures, it will be clear to those skilled in the arts to which the invention pertains that many changes and modifications may be made thereto without departing from the scope of the invention.

I claim:

1. An internal combustion engine utilizing a swirl induced stratified charge combustion process comprising, a cylinder bore slidably receiving a piston therein, a cylinder head closing said bore and together with said piston and the walls of said bore defining a combustion chamber therebetween, an air intake passage in said head member, an air intake port connected to said passage and opening into said chamber and closed by a reciprocable valve member movable into and out thereof, said port being offset to one side of the axis of said bore and symmetrically arranged on a centerline of said bore, said passage and bore having configurations so constructed and arranged for cooperation with said valve to provide the flow of a charge of air into said chamber essentially tangential to said centerline and with a general motion from one side of said chamber to the other along the head surface, the facing surfaces of said piston and head being arcuately shaped so as to together with the walls of said bore induce a swirling of said charge of air around an axis essentially at right angles to the bore axis to vaporize any fuel injected therein, a liquid fuel injector positioned to inject fuel as a liquid against a surface of one of said intake passage and said port and said valve so as to be picked up by an edge portion of said air charge as it flows therepast into said combustion chamber to provide a side-by-side arrangement of an essentially vertically disposed fuel impregnated edge air portion of the charge and a residual air portion, and spark ignition means offset from the axis of said bore and projecting into said chamber into said fuel impregnated air portion for igniting said portion.

2. An engine as in claim 1, said fuel injector projecting into said intake passage to discharge fuel as a liquid against a wall of said passage.

3. An engine as in claim 1, said fuel injector extending into said passage at an angle to the axis of said bore to discharge fuel against a surface on said valve.

4. An engine as in claim 1, said injector extending through said passage into said port to inject fuel against an edge of said valve traversed by the charge of air passing into said combustion chamber.

5. An engine as in claim 2, said passage having a flow restricting portion therein to increase the flow velocity of air entering said combustion chamber.

6. An engine as in claim 1, said passage having partition means therein dividing said passage into essentially parallel conduits, said injector projecting into one of said conduits for injecting fuel therein.

7. An engine as in claim 1, said one conduit having a smaller cross-sectional area than the remaining of said parallel conduits.

References Cited by the Examiner

UNITED STATES PATENTS

| | | | |
|---|---|---|---|
| 1,643,396 | 9/1927 | Trussell | 123—75 |
| 1,691,182 | 11/1928 | Davol | 123—32 |
| 1,816,366 | 7/1931 | Dinner | 123—32 |
| 1,835,490 | 12/1931 | Hesselman | 123—32 |
| 2,036,253 | 4/1936 | Bremser | 123—32 |
| 2,165,176 | 7/1939 | Fodor | 123—32 |
| 2,269,104 | 1/1942 | Hedlund | 123—32 |
| 2,457,652 | 12/1948 | Fisher | 123—32 |
| 2,698,613 | 1/1955 | Jagersberger | 123—119 |
| 2,882,873 | 4/1959 | Witsky | 123—32 |
| 3,056,392 | 10/1962 | Daub | 123—32 |
| 3,092,088 | 6/1963 | Goossak et al. | |
| 3,107,658 | 10/1963 | Meurer | 123—32 |
| 3,125,079 | 3/1964 | Hoffmann | 123—32 |
| 3,171,395 | 3/1965 | Bartholomew | 123—52 |
| 3,238,930 | 3/1966 | Von Seggern et al. | 123—32 |

MARK NEWMAN, *Primary Examiner.*

LAURENCE M. GOODRIDGE, *Examiner.*